United States Patent [19]

Cheney, Jr.

[11] 4,438,648

[45] Mar. 27, 1984

[54] DIFFERENTIAL MASS FLOWMETER

[75] Inventor: Robert J. Cheney, Jr., Mountlake Terrace, Wash.

[73] Assignee: Eldec Corporation, Lynnwood, Wash.

[21] Appl. No.: 390,070

[22] Filed: Jun. 18, 1982

[51] Int. Cl.³ .............................................. G01F 1/82
[52] U.S. Cl. .................................... 73/195; 73/861.35
[58] Field of Search ...................... 73/195, 196, 861.35, 73/861.36

[56] References Cited

U.S. PATENT DOCUMENTS

| | | | |
|---|---|---|---|
| 2,953,920 | 9/1960 | Machlanski | 73/196 |
| 3,306,105 | 2/1967 | Ichihara et al. | 73/861.35 |
| 3,740,586 | 6/1973 | Banks et al. | |
| 3,807,229 | 4/1974 | Chiles | |
| 3,877,304 | 4/1975 | Vetsch | |
| 3,958,447 | 5/1976 | Baker et al. | |
| 4,012,957 | 3/1977 | Chiles et al. | |

FOREIGN PATENT DOCUMENTS 1107781  3/1968  United Kingdom .................. 73/196

Primary Examiner—Herbert Goldstein
Attorney, Agent, or Firm—Christensen, O'Connor, Johnson & Kindness

[57] ABSTRACT

A flowmeter is provided for receiving a plurality of fluid streams and providing signals representative of the mass flow rate of each stream and the differential mass flow rate of any selected pair of the streams. A housing defines a flow channel to accommodate each stream to be measured. An impeller is rotatably mounted in each channel to impart measured angular momentum to the fluid flowing in that channel and all of the impellers are driven by a common turbine and shaft. The impellers are each resiliently coupled to the shaft so that the impellers lag behind the shaft by an amount proportional to the angular momentum imparted by each impeller to the fluid in its respective channel. Pick-off means associated with each impeller produce lag signals representative of the impeller lag angle and the lag signals are applied to a signal processor that produces individual mass flow rate signals and differential mass flow rate signals representative of the difference in mass flow rate of any two selected fluid streams.

10 Claims, 3 Drawing Figures

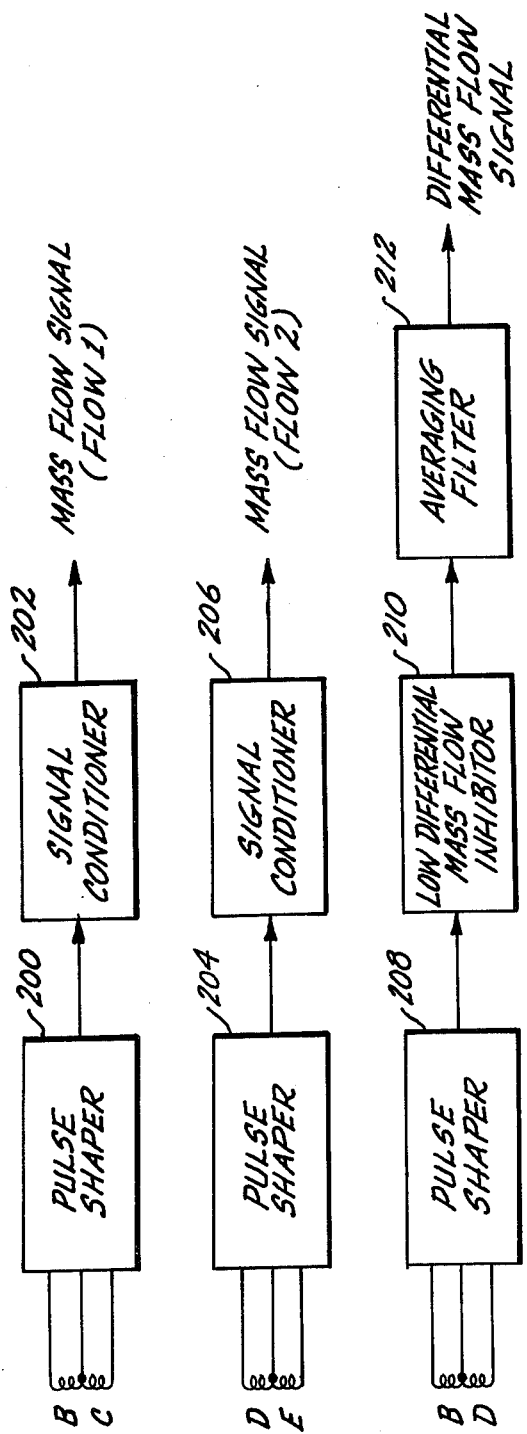

DIFFERENTIAL MASS FLOWMETER

BACKGROUND OF THE INVENTION

The present invention relates to mass flowmeters and more particularly relates to a mass flowmeter that directly measures the difference between the mass flow rates of two fluid streams.

Flowmeters for measuring the mass flow rate of a fluid, such as a fuel, through the production of electrical signals representative of the mass flow rate are well known. Such flowmeters are shown in the U.S. Pat. Nos. 3,740,586 to Banks et al. and 3,807,229 to Chiles. Similarly, flowmeters for measuring the volumetric flow rate of a fluid through the production of electrical signals representative of such volumetric flow rate are also well known.

The fluid flowmeters with which the present invention is particularly concerned are those including a rotatable measurement assembly contained within a housing that is adapted for interconnection into the conduit through which the fluid is flowing.

In one type of volumetric flowmeter known to the prior art, the measurement assembly comprises a turbine having a plurality of turbine drive surfaces that are angled with respect to the direction of fluid flow through the housing so that the turbine is rotated by the fluid at a velocity proportional to the volumetric flow rate of the fluid.

In one type of mass flowmeter known to the prior art, the measurement assembly comprises a rotatable drum, an impeller for imparting angular momentum to the fluid, and a resilient torsion spring interconnecting the drum and the impeller. The impeller, because of the torsion spring coupling, will lag behind the first member by a deflection angle dependent upon the angular momentum imparted to the fluid. The deflection angle is therefore proportional to the mass rate of fluid flow through the impeller and measurement of the deflection angle will provide an output that is proportional to mass flow rate. The drum may be driven by a motor drive assembly, or may be driven by the fluid itself, through a turbine drivingly connected to the drum. The latter type of mass flowmeter, also known as a motorless mass flowmeter, is disclosed in U.S. Pat. No. 3,877,304 to Vetsch, issued on Apr. 15, 1975, and assigned to the assignee of the present invention. Typically, in mass flowmeters of the type described above, magnets are located on the periphery of both the drum and the impeller. The magnets induce pulse energy into a pair of stationary pick-off coils positioned adjacent the path of the magnets on the rotating drum and the deflected impeller. The signals induced into the coils will be out of phase by a factor proportional to the deflection angle between the drum and the impeller. The phase difference between successive pulses from the drum pick-off coil and the impeller pick-off coil is therefore proportional to the mass flow rate of the fluid.

The mass flow rate is, in many instances, the most important information concerning the flow rate of a fluid. The mass flow rate of fuel, for instance, is a desired measurement that is monitored in engine-testing procedures to provide an indication of engine condition and in actual engine use to provide information concerning the rate at which fuel is being used. Prior art mass flowmeters, however, are incapable of accurately measuring the net flow or flow consumed by a process wherein only a portion of the supply flow is consumed, the balance of the flow being returned to its source. An example of an environment in which such net flow measurement is important is in a diesel engine fuel system where a variable portion of the fuel supplied to the diesel engine is actually consumed by the engine. The variable remaining portion of the fuel supplied is used for injector lubrication and cooling and is returned to the source of supply to be resupplied to the engine. As a typical example, 20 percent of the fuel supplied to the engine may actually be consumed, with 80 percent of the supplied fuel returning to the source of supply for resupply.

It is theoretically possible to use a first prior art mass flowmeter to measure the mass flow rate of the supply flow to such a diesel engine and to use a second prior art mass flowmeter to measure the mass flow rate of the return flow. The difference between the measured supply mass flow rate and the measured return mass flow rate (the differential mass flow rate) would then be indicative of the rate at which fuel is being consumed by the engine. However, in actual practice it turns out that such a technique leads to significant errors in the measurement of differential mass flow rate. To give an example, let it be assumed that a typical prior art mass flowmeter has an accuracy of plus or minus two percent ($\pm 0.02$). Let it be further assumed that the actual supply mass flow rate ($MF_{1\ actual}$) is equal to P lbs/hr. and that the actual return mass flow rate ($MF_{2\ actual}$) is equal to 0.8P lbs/hr. Therefore, the actual differential mass flow rate (or, the fuel consumed by the engine) is 0.2P lbs/hr. Taking the worst case situation where the flowmeter measuring the supply mass flow rate has an error of plus two percent ($+0.02$) and the flowmeter measuring the return mass flow rate has an error of minus two percent ($-0.02$), the measured supply mass flow rate, $MF_{1\ measured}$ would be $(1.02) \times (P\ lbs/hr.)$ or 1.02 lbs/hr. and the measured return mass flow rate, $MF_{2\ measured}$ would be $(0.98) \times (0.8P)$ or 0.784P lbs/hr. The measured differential mass flow rate, then, would equal $MF_{1\ measured}$ minus $MF_{2\ measured}$, or 0.236P lbs/hr. By subtracting the actual differential mass flow rate (0.2P lbs/hr.) from the measured differential mass flow rate (0.236 lbs/hr.) the measured error can be seen to be 0.036P lbs/hr., which is a measurement error of eighteen percent (18%). It is important to note that an accuracy within $\pm 2\%$ is regarded by the industry as being of superior quality. Yet, even with such superior quality, the final measurement can have an error of 18%.

It is therefore an object of the present invention to provide a mass flowmeter that can accurately measure the differential between the mass flow rates of two fluid streams.

It is another object of the present invention to provide a single flowmeter unit that provides signals representative of the individual mass flow rates of each of two or more fluid streams as well as the differential mass flow rate between pairs of any two of the fluid streams.

SUMMARY OF THE INVENTION

In accordance with the above-stated objects, a flowmeter includes means for defining a first and a second flow channel. A first impeller means is mounted for rotation in the first flow channel for imparting angular momentum to fluid flowing therein and a second impeller means is mounted for rotation in the second flow channel for imparting angular momentum to the fluid flowing in the second channel. A drum is provided associated with each of the impellers, each drum mounted on a central shaft common to both measurement elements. Each impeller is connected to its respective drum by a torsion spring. Means are provided for rotating the common shaft and thereby rotating the drum assemblies in the first and in the second fluid channels. As the drum and impeller rotate, each impeller imparts angular momentum to the fluid flowing through its respective fluid channel and, due to the torsion spring coupling, the impeller will lag behind its associated drum by a deflection angle proportional to the mass flow rate of the fluid passing through the respective first or second channel. A means is associated with each impeller for providing a signal representative of the instantaneous angular position of the impellers. Signal-processing means are provided for receiving said position representative signals and combining said signals to provide a signal representative of the difference in instantaneous angular position between the impellers, which signal is also representative of the differential between the mass flow rates of the fluids in the first and second channels.

In the preferred embodiment, the signal-processing means also includes means for producing signals representative of the deflection angle between each drum and impeller assembly and producing signals representative of the individual mass flow rates of the fluid flowing through the first and the second channels. Also, in the preferred embodiment of the invention, a turbine is provided in the first fluid channel affixed to the common shaft, the common shaft being driven by the force of fluid passing through the first channel and impinging upon the vanes of the turbine.

BRIEF DESCRIPTION OF THE DRAWINGS

The above objects and advantages of the present invention will become more apparent to those of ordinary skill in the art and others upon reading the ensuing specification, taken in conjunction with the accompanying drawings in which:

FIG. 2 is a block diagram of the flowmeter electronics associated with the transmitter of FIG. 1 for producing individual and differential mass flow rate output signals for the fluid streams.

DESCRIPTION OF THE PREFERRED EMBODIMENT

Figure 1A:
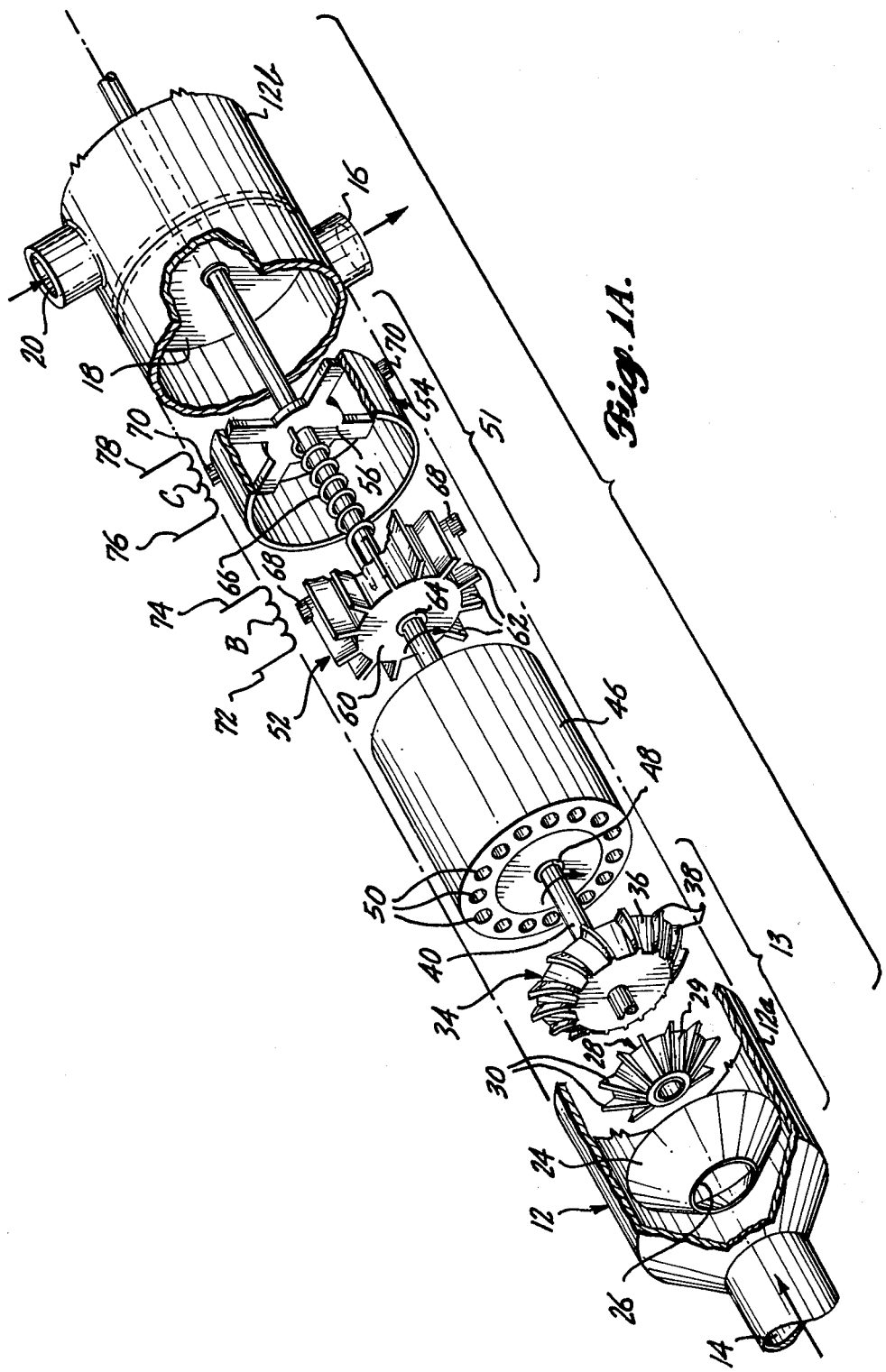
FIGS. 1A and 1B, when taken together, form a pictorial representation of a flowmeter transmitter made in accordance with the principles of the present invention that generates both individual and differential mass flow rate information for two separate fluid streams.
Figure 1B:
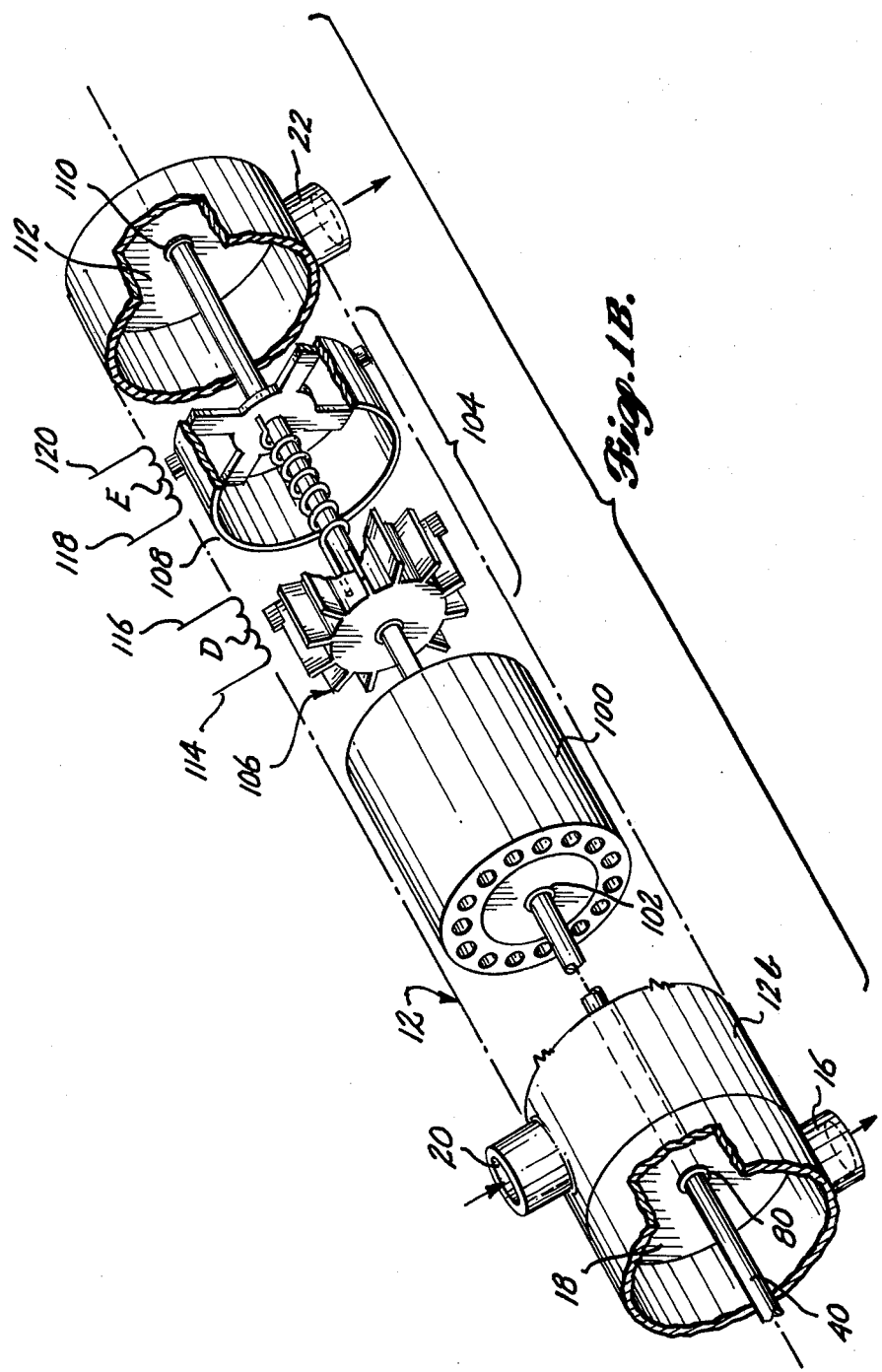

The transmitter of a flowmeter made in accordance with the principles of the present invention is shown pictorially in FIGS. 1A and 1B. The illustrated flowmeter transmitter is adapted to accept two streams of fluid flow and is described as a two-stage, differential flowmeter for the sake of simplicity. It should be understood that any reasonable number of stages can be utilized to determine the differential mass flow rate between any two of a plurality of fluid streams.

The transmitter includes a housing 12 having a first-stage entry port 14 into which a major stream of flowing fluid to be measured is directed, for example, the supply flow to the diesel engine described above. After entering the entry port 14, the fluid flows through a first portion 12a of the housing 12 and exits the housing through a first-stage exit port 16. The exit port 16 is located near the midlength of the housing adjacent and ahead of a barrier wall 18, which divides the housing into first and second portions. Beyond the barrier 18 is a second-stage entry port 20 through which a minor stream of fluid enters the second portion 12b of the flowmeter housing. The minor stream of fluid could be, for example, the return flow of diesel fuel from the diesel engine back to the source of supply. Fluid entering the housing through the second-stage entry port 20 flows through the second portion 12b of the housing and exits the housing through a second-stage exit port 22.

Fluid entering the transmitter through the first-stage entry port 14 initially encounters a drive element assembly indicated generally as 13. Within assembly 13, the fluid first encounters a bypass shroud 24, which in the illustrated embodiment is of frustoconical shape, having its apex end positioned nearest the first entry port 14. The bypass shroud 24 is positioned axially coincident with the flow of fluid through the transmitter housing. The apex end of the bypass shroud 24 has a circular opening 26 formed therein through which a portion of the fluid stream flows. A portion of the fluid stream travels over the outer surface of the bypass shroud 24 and around the drive element assembly 13. The remaining portion of fluid passes through the circular opening 26 in the bypass shroud 24 and is directed to a stationary flow-straightening element 28 that is axially aligned with the bypass shroud 24. The flow-straightening element 28 comprises a frustoconical portion 29 that is positioned so that the axis of the cone is generally in line with the stream of fluid passing through circular opening 26. A plurality of generally triangular vanes 30 extends from the outer surface of the frustoconical portion 29 facing the bypass shroud 24. The vanes 30 are equally spaced about the periphery of and perpendicular to the outer surface of the frustoconical portion 29. The fluid passes between the parallel vanes 30 so as to remove any angular momentum from the fluid flowing through the opening 26 in the bypass shroud 24.

The fluid stream entry from flow-straightening element 28 next encounters a turbine 34 that is affixed to and supported for rotation on a shaft 40 that lies along the central axis of the housing 12. The turbine is oriented substantially perpendicular to the fluid stream. The turbine 34 includes first and second opposed circular surfaces. The first circular surface is nearest the flow-straightening element 28 and is somewhat smaller than the second circular surface. The circular surfaces are joined by a substantially frustoconical peripheral edge portion 36, which angles outwardly from the first surface to the second surface in the direction of flow of the fluid stream. Positioned along the peripheral edge portion is a series of thin, evenly spaced turbine vanes 38, each turbine vane positioned on the peripheral edge at an approximately 45° angle relative to the direction of flow. Each of the vanes is substantially orthogonal to the surface of the peripheral edge portion and extends substantially across the entire edge portion. The vanes of the turbine 34 are arranged so that the fluid flowing across the peripheral edge portion of the turbine 34 encounters the vanes and imparts an angular rotation to the turbine.

The fluid exiting from turbine 34 then combines with the fluid bypassed around the drive element assembly 13 and the combined fluid stream passes through a stationary flow straightener 46 that removes any rotational component of motion from the fluid. The shaft 40 passes through a bearing 48 that mounts the shaft within the flow straightener 46 so that the shaft can rotate freely within the bearing while the flow straightener remains stationary. The flow straightener comprises essentially a cylindrical body having a series of long parallel holes 50 formed axially therethrough through which the fluid flows to remove any angular momentum therefrom.

The fluid then encounters a mass flow rate measurement assembly designated generally as 51. In assembly 51, the fluid first encounters a rotatable impeller 52, which in practice is contained and rotates within a rotatable cylindrical drum 54. The drum 54 protects the impeller 52 from viscous drag against the housing portion 12a. For the purposes of illustration and explanation, the impeller 52 is shown separated from the drum 54. The drum 54 includes a central support spider 56, by which it is affixed to the shaft 40 so that drum 54 rotates with shaft 40 and the spider 56. Included in the impeller 52 is a central hub portion 60 that has located on a peripheral surface thereof a plurality of spaced impeller blades 62 extending parallel to shaft 40. The impeller is supported by a bearing means 64 on the shaft 40 and is affixed to one end of a torsion spring 66. The other end of the torsion spring 66 is connected to the central portion of the spider 56 and thus to the shaft 40.

As will be appreciated, due to the interconnection provided by the spring 66, the impeller 52 will be rotated at the same speed as drum 54 and shaft 40. A force, however, is required to rotate the impeller 52 in the path of the fluid due to the interaction of the impeller blades with the fluid issuing forth from the flow straightener holes 50. The force to move the impeller through the fluid is transmitted from the shaft 40 to the impeller 52 through the spring 66. The spring 66 deflects so that the impeller 52 lags the shaft 40 and the other elements interconnected with the shaft, including the drum 54. The spring 66 is designed to have a linear force versus deflection characteristic, so that the deflection angle or lag between the impeller and the drum is a measure of the force required to move the impeller due to drag of the impeller blades through the straightened fluid. As is well known, this force is proportional to the mass flow rate of the major fluid stream flowing through the housing portion 12a.

The greater the mass flow rate, the larger the deflection angle between corresponding points on the impeller 52 and the drum 54 considered with respect to a common fixed reference point. The deflection angle is conveniently measured by attaching a plurality of magnets 68 to the impeller at spaced locations about the circumference of the impeller and a like plurality of magnets 70 about the circumference of the drum. A first-stage impeller pick-off coil B and a first-stage drum pick-off coil C are mounted within the housing in axial proximity to the impeller and the drum. The magnets 68 and 70 are preferably aligned in a direction parallel to the axis of revolution at zero flow rate so that the time differences between pulses induced in the impeller pick-off coil with respect to pulses induced in the drum pick-off coil are a direct measure of the deflection angle between the impeller and the drum, which in turn is a direct measure of the mass flow rate of the fluid. The pulses appearing at the output terminals 72 and 74 of the coil B and output terminals 76 and 78 of the coil C are applied to the electronics portion of the flowmeter shown in FIG. 2 that will be described below.

After passing through the mass flow measurement assembly 51, the major fluid stream exits the first housing portion 12a through the first-stage exit port 16. The shaft 40 continues on through the barrier wall 18 into the second portion 12b of the flowmeter housing. The shaft 40 passes through a bearing or seal assembly 80 mounted in the barrier wall 18. The minor fluid stream enters the housing through the second-stage entry port 20 and encounters a stationary flow straightener 100 that is similar to the stationary flow straightener 46 described above. The shaft 40 passes through a bearing 102 mounted in the flow straightener 100 so that the shaft is free to turn within the flow straightener. A second mass flow measurement assembly generally designated as 104 is located in the second portion 12b of the housing and upon passing through the flow straightener 100 the fluid encounters an impeller 106 and a drum 108 identical to the drum 54 and impeller 52 described above. The drum 108 and impeller 106 have associated therewith a second-stage drum pick-off coil E and a second-stage impeller pick-off coil D that provide signals representative of the mass flow rate of the minor fluid stream flowing through the second housing portion 12b. The shaft 40 is journalled in a bearing 110 mounted in an end wall 112 of the housing 12 or in some other suitable location. The fluid exits the second housing portion 12b through the second-stage exit port 22. The signals present at the output terminals 114 and 116 of the second-stage impeller pick-off coil D and the terminals 118 and 120 of the second-stage drum pick-off coil E are applied to the electronics portion of the flowmeter shown in FIG. 2 that will be described below.

As mentioned above, further stages of the flowmeter transmitter could be provided to measure the mass flow rate of additional fluid streams and the differential mass flow rate of any two of those streams, however, for the sake of simplicity, the present flowmeter is being described as a two-stage instrument operating to measure the differential mass flow rate of two distinct fluid streams.

As discussed above, the signals appearing at the output connections of the first-stage impeller and drum pick-off coils will be pulsed signals of the same frequency but varying in phase due to the deflection angle between the impeller and the drum. The phase difference $\Delta T_1$ between the pulses from the drum and impeller pick-off coils B and C is proportional to the mass flow rate of the major fluid stream. Similarly, the signals appearing at the output connections of the second-stage drum and impeller pick-off coils will also be pulsed signals of the same frequency but varying in phase and their phase difference $\Delta T_2$ is proportional to the mass flow rate of the minor fluid stream. Since both the first-stage and second-stage drums are affixed to the common shaft 40, both drums will rotate at the same speed and the pulses from the first-stage and the second-stage drum pick-off coils will have a constant phase relationship with each other. Therefore, since both the first-stage and second-stage impeller pick-off signals are referenced to signals that have a constant phase relationship, the phase difference between the signals from the first and second-stage impeller coils $\delta T$ is proportional to the difference in deflection angles between the impellers and a common reference and accordingly proportional to the differential mass flow rate of the major and minor fluid streams. The same relationship would be true for any pair of fluid streams in any two stages of a multistage embodiment of the flowmeter, as long as the drums associated with each stage of the flowmeter rotate at the same speed and with constant phase relationship.

Referring now to FIG. 2, the signals from the first-stage impeller coil B and the first-stage drum pick-off coil C are applied to the input of a pulse shaper 200 that combines the signals into a single, pulsed output signal in which the width of the pulses are representative of the phase difference between the two input signals. From the pulse shaper the output signal is applied to a signal conditioner 202 that produces a DC signal, the voltage of which is representative of the mass flow rate of the fluid in the major stream. Similarly, the signals from the second-stage impeller pick-off coil D and the second-stage drum pick-off coil E are applied to the inputs of a second pulse shaper 204 whose output signal is applied to a signal conditioner 206 to produce a second mass flow signal that is representative of the mass flow rate of the fluid in the minor stream. The pulse shapers 200 and 204 and signal conditioners 202 and 206 may be of the type described in U.S. Pat. No. 3,740,586 to Banks et al. issued June 19, 1973, and assigned to the assignee of the present invention, which patent is incorporated herein by reference.

Because the signals emanating from the first- and second-stage drum pick-off coils C and E are of the same frequency and have a constant phase relationship, it is possible to apply the first- and second-stage impeller pick-off coil signals directly to a pulse shaper to arrive at a differential mass flow rate signal representative of the difference in mass flow rate of the major and minor flow streams. The signals from the coils B and D are first applied to the input of a pulse shaper 208, which combines the signals into a single pulse width modulated signal, the width of the pulses being proportional to the difference in angular position between the first and second impellers and therefore being proportional to the differential mass flow rate. Typically, the second-stage, or minor, flow impeller pulse will lead the first-stage, or major, flow impeller pulse by a time period proportional to the difference between the flow rates. When applied to the pulse shaper, the second-stage impeller signal will turn the pulse shaper circuit on and the first-stage impeller pulse will turn the pulse shaper circuit off. This action results in a square wave output signal comprised of a series of pulses, the width of which represents the difference between the major and minor mass flow rates. Preferably, the output signal from the pulse shaper 208 is applied to a low differential mass flow inhibitor circuit 210. The inhibitor circuit imposes a threshold on the differential mass flow signal. If the width of any pulse in the output signal emanating from the pulse shaper is less than a predetermined threshold level, the inhibitor will not allow the signal to pass. The blocking of pulses below a certain threshold level effectively eliminates jitter in low-magnitude differential mass flow signals. After passing through the low differential mass flow inhibitor 210, the signal is applied to an averaging filter 212 that averages out the durations of the consecutive pulses and provides an output signal consisting of a smooth DC voltage that varies in proportion to the average pulse width of the incoming signal and thus to the differential mass flow rate. The smoothed and averaged output from the averaging filter 212 is the differential mass flow signal that can be applied to a suitable display indicator such as an appropriately scaled voltmeter.

From the foregoing, it can be seen that by utilizing the configuration of the present invention, individual mass flow rate signals for two distinct fluid streams can be obtained and at the same time, a signal representative of the difference in mass flow rates between any two fluid streams can be also obtained. By using the configuration of the present invention, a significant source of second order error is eliminated since both measurement impeller/drum assemblies rotate at identical speed. As discussed above and in the referenced patents, the theory of operation of angular momentum mass flowmeters such as are described here holds that the time difference between passage of the drum and impeller magnets under their respective pick-off coils is a function only of the mass flow rate of the fluid through the measurement assembly. While that is true to a first order approximation, there are second order effects that become important when extreme accuracy is desired. One of the significant second order effects is of the measurement assembly. When two independently rotating measurement assemblies are used, a difference in rotational speed between the two can show up as a measurement error. By tying the measurement assemblies to a common shaft, the possibility of a difference in rotational speed is eliminated, thereby eliminating a source of error.

Also the use of a single housing and common shaft facilitates the adjustment and removal of error in the calibration process. It is simple with the design of the invention to repeatedly reach a null error condition at the point of zero differential mass flow rate. The repeatability of the null point minimizes the effect of zero drift.

It will be noted by those of ordinary skill in the art and others that while a particular embodiment of the present invention has been described and illustrated herein, that several changes can be made to that embodiment, while remaining within the scope of the present invention. For example, as earlier described, while the flowmeter described herein is a two-stage flowmeter, any reasonable number of stages can be added, simply by providing additional impeller and drum assemblies tied to the same common shaft and providing separate fluid paths for the additional stages. Through the proper combination of signals provided by the various stages, the differential mass flow rate between any two of them can be determined in accordance with the present invention. Further, while the illustrated embodiment utilizes a turbine in the first portion of the flowmeter housing to drive the common shaft and drum assemblies, it is also possible to use a constant-speed motor to drive the shaft. Also with regard to the turbine, the turbine in the illustrated embodiment is located in the first housing portion and is driven by the major flow. The flowmeter of the present invention would still operate if the turbine were driven by the minor flow. However, it is preferable to drive the turbine with the major flow since it will provide a greater rotational speed to the turbine. Since changes such as those outlined above and others can be made in the illustrated embodiment without exceeding the scope of the invention, the invention should be defined solely by reference to the appended claims.

The embodiments of the invention in which an exclusive property or privilege is claimed are defined as follows:

1. An apparatus for measuring the difference between the mass flow rate of a first fluid stream and the mass flow rate of a second fluid stream comprising:
   means defining a first flow channel through which said first fluid stream passes;
   means defining a second flow channel through which said second fluid stream passes;
   a first drum member mounted for rotation in said first flow channel;
   a second drum member mounted for rotation within said second flow channel;
   driving means associated with said first and second drum members for rotating said first and second drum members at identical speed and with a constant phase relationship;
   a first impeller means mounted for rotation in said first flow channel for imparting angular momentum to said first fluid stream, and first impeller means being resiliently coupled to said first drum member to allow said first impeller means to lag behind said first drum member by an amount proportional to the angular momentum imparted to said first fluid stream by said first impeller means;
   a second impeller means mounted for rotation in said second flow channel for imparting angular momentum to said second fluid stream, said second impeller means being resiliently coupled to said second drum member to allow said second impeller means to lag behind said second drum member by an amount proportional to the angular momentum imparted to said second fluid stream by said second impeller means;
   first impeller pick-off means associated with said first impeller means to produce a first impeller signal representative of the instantaneous angular position of said first impeller means;
   second impeller pick-off means associated with said second impeller means for producing a second impeller signal representative of the instantaneous angular position of said second impeller means; and
   first signal-processing means for receiving said first and second impeller signals and combining them to produce a signal representative of the difference in instantaneous angular position between said first and second impellers which signal is also representative of the difference in mass flow rate between said first and second fluid streams.

2. The apparatus of claim 1 further including a shaft mounted for rotation in said first and second housing portions substantially parallel to the direction of flow of fluid through said first and second channels, said shaft being coupled to said driving means and said first and second drum members being affixed to said shaft.

3. The apparatus of claim 2 wherein said driving means comprises: a turbine affixed to said shaft and mounted for rotation within said first flow channel, said turbine being rotated by said first fluid stream.

4. The apparatus of claim 1 further including:
   a first drum pick-off means for producing a first drum signal representative of the instantaneous angular position of said first drum member;
   a second drum pick-off means for producing a second drum signal representative of the instantaneous angular position of said second drum member, said first drum signal and said second drum signal being applied to said first signal-processing means to be combined with said first impeller signal and said second impeller signal to produce a first lag signal representative of the deflection angle between said first drum member and said first impeller, said first lag signal also being representative of the mass flow rate of said first fluid stream, and to produce a second lag signal representative of the deflection angle between said second drum member and said second impeller, said second lag signal also being representative of the mass flow rate of said second fluid stream.

5. The apparatus of claim 1 wherein said first drum member and second drum member are respectively coupled to said first impeller means and said second impeller means by respective torsion springs.

6. The apparatus of claim 1 wherein said first signal-processing means includes a pulse shaper for combining said signals from said first and second impeller pick-off means to produce a pulse width signal in which the width of each pulse is proportional to the difference in instantaneous angular position between said first and second impellers; and
   an averaging filter for receiving said pulse width signal and producing a DC signal the magnitude of which is representative of the differential mass flow rate of said first and second fluid streams.

7. The apparatus of claim 6 further including a low differential mass flow inhibitor associated with the output of said pulse shaper and the input of said averaging filter for blocking said pulse width signal from being applied to said averaging filter unless said pulse widths are greater than a predetermined magnitude.

8. An apparatus for measuring the difference in mass flow rate between any pair of a plurality of fluid streams, including:
   a housing defining a plurality of fluid flow channels, each of which is associated with one of the said plurality of fluid streams;
   an impeller means mounted for rotation in each of said flow channels for imparting angular momentum to the fluid stream within an associated channel;
   a single driving means resiliently coupled to all of said impeller means to rotate each of said impeller means at identical speed, said resilient coupling allowing each said impeller means to lag behind said driving means by an amount proportional to the angular momentum imparted by said impeller to the fluid stream in its associated flow channel;
   impeller pick-off means associated with each impeller means for producing impeller signals representative of the instantaneous angular position of each said impeller means;
   signal-processing means for receiving said impeller signals and combining any two of them to produce a difference signal representative of the difference in instantaneous angular position between the impellers whose signals are combined, which signal is also representative of the difference in mass flow rates between the two fluid streams whose impeller signals are combined.

9. The apparatus of claim 8 wherein said driving means includes a shaft to which each of said impellers is resiliently coupled and a turbine affixed to said shaft, said turbine being mounted for rotation within one of said flow channels and being driven by the flow of fluid through said flow channel.

10. The apparatus of claim 9 further including:
    a plurality of drums, each drum affixed to said shaft and mounted for rotation within one of said fluid flow channels, each drum resiliently coupled to its associated impeller means;

drum pick-off means associated with each drum for producing a drum signal representative of the instantaneous angular position of its associated drum, said drum pick-off signals being provided to said signal-processing means and combined with the impeller signal of its associated impeller to produce a lag signal representative of the deflection angle between the particular drum and its associated impeller means, which signal is also representative of the mass flow rate of the fluid stream in the fluid flow channel associated with the particular drum and impeller means.

* * * * *